June 27, 1944. E. R. MANLEY 2,352,278
APPARATUS FOR UNDERCUTTING COMMUTATORS
Filed July 30, 1941 2 Sheets-Sheet 1
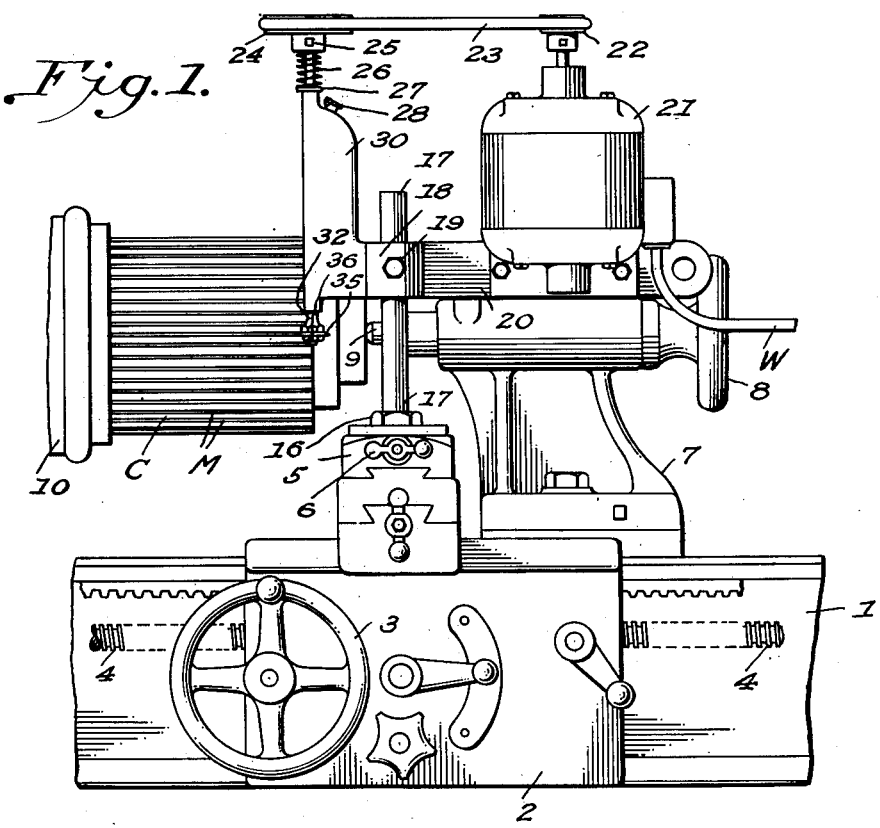
Inventor
EVERETT R. MANLEY
By Dudley Cole & Garner
Attorneys June 27, 1944.  E. R. MANLEY  2,352,278
APPARATUS FOR UNDERCUTTING COMMUTATORS
Filed July 30, 1941  2 Sheets-Sheet 2
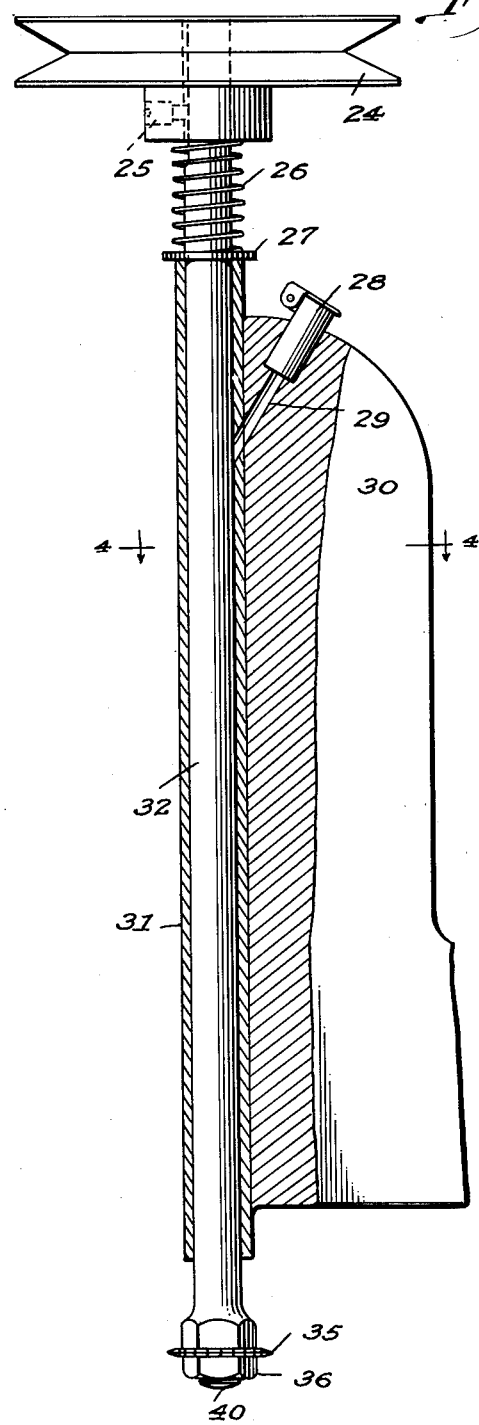
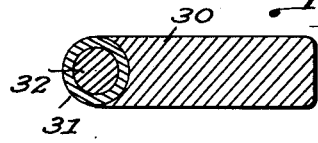
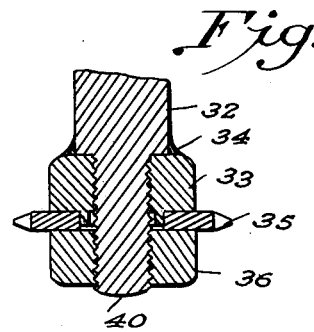
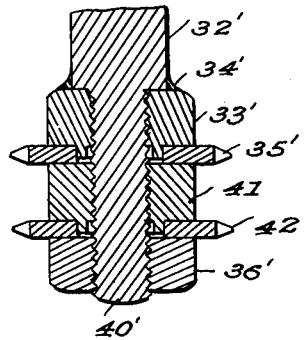
Inventor
EVERETT R. MANLEY
By Dury Cole & Garner
Attorneys Patented June 27, 1944

2,352,278

UNITED STATES PATENT OFFICE 2,352,278

APPARATUS FOR UNDERCUTTING COMMUTATORS

Everett R. Manley, Fairmont, W. Va.

Application July 30, 1941, Serial No. 404,725

2 Claims. (Cl. 90—11)

This invention relates to commutator undercutters designed to undercut the mica or other insulation between the commutator segments of an electric motor or generator.

It is the object of the present invention to provide a precision tool which is portable as well as rugged.

It is a further object of the invention to provide an assembly which may be conveniently mounted on a lathe for the purpose of expeditiously undercutting the mica strips between the commutator segments. In addition, the invention comprehends the disposition of the assembly adjacent to larger motor commutators mounted upon any other type of stand having the capability of undercutting the mica strips in devices quickly and accurately.

It is a further object of the invention to execute the undercutting operation with a rotating milling cutter mounted in such a manner that the undercut slots are of uniform depth and extend precisely along the mica strips without any possibility of scoring the commutator bars, despite any faulty setting or disposition of the commutator bars such as might be occasioned by a skewed alinement of the parts. The cutter mounting is designed to last for long periods of time despite adverse operating conditions as are occasioned by the generation of abrasive dust resulting from the undercutting operation.

It is a further object of the invention to expedite the undercutting operation by the provision of a plurality of milling cutters on the operating shaft which are effective in cutting more than one slot at a time when adjusted for a predetermined spacing between commutator bars, which may be suitably varied to meet different commutator designs.

It is a further object of the invention to provide a milling cutter which is effective in undercutting the mica at the front of the commutator within full vision of the operator, which results in lesser demand on the operator's attention in the execution of the undercutting operation, thereby increasing the efficiency and speed of the operation while lessening the fatigue.

The invention is characterized by marked simplicity since the same is composed of relatively few parts which may be changed and replaced easily.

The invention is characterized by the provision of a support which may be easily adjusted in respect to its elevation as well as angular inclination upon a vertical post, which preferably is attached on a lathe in the same position as a tool post on the lathe carriage. The adjustable support has mounted thereon an electric motor, which is arranged on a vertical rotational axis with a pulley at the upper end thereof. A bracket on the support has attached thereto a continuous bearing of suitable material in which is disposed the rotary spindle shaft carrying the milling cutter at the lower end thereof and a pulley at the upper end thereof. A transmission belt extends between the last-mentioned pulley and the pulley on the motor, and the motor is adjustably mounted on the support by suitable bolts in order to adjust the tightening of the belt. The flexible transmission of the endless belt from the motor to the rotary milling cutter shaft insures long life with the absence of vibration. The rotary shaft is yieldingly supported in the continuous bearing provided therefor by a spring which is balanced substantially against the weight of the shaft assembly, and in effect the shaft floats in the bearing so that the milling cutter is free to accommodate itself in the slot between the commutator bars which is being undercut, even though the slot does not extend in a rectilinear direction corresponding to the movement of the support. The continuous bearing effectively prevents the intrusion of foreign matter thereinto, which would ultimately cause its disintegration and the inaccurate operation or wobbling of the rotary cutter.

Other objects and purposes will appear from the more detailed description of the invention following hereinafter taken in conjunction with the following drawings wherein:

Fig. 1 is a front elevation of the apparatus attached to a lathe for the purpose of undercutting the mica in a commutator mounted thereon;

Fig. 2 is a plan view of Fig. 1;

Fig. 3 is a vertical sectional view with certain parts in elevation of the left extremity of the bracket of the support and the rotating cutter mounted therein;

Fig. 4 is a horizontal sectional view along line 4—4 of Fig. 3;

Fig. 5 is a vertical sectional view of the lower extremity of the rotating cutter shown in Fig. 3, and Fig. 6 is a vertical sectional view of a different embodiment of the cutter assembly.

In Fig. 1, a commutator composed of copper bars C spaced from each other by mica spacers M is shown mounted in a lathe chuck 10 for the purpose of undercutting the mica strips between the copper segments of the commutator. The pointed support 9 on the tailstock 7 controlled by the hand wheel 8 provides stability for the support of the commutator which is maintained stationary between the successive angular movements which bring the mica spacers M within the field of operation of the milling cutter operating upon the front of the commutator.

The assembly in accordance with the present invention is illustrated as mounted in a position on the lathe to correspond to the position of the tool post on the lathe carriage. Thus the carriage 2 moves on the feed screw 4 by the operation of the hand wheel 3, and the carriage carries therewith the pedestal 15 of the tool assembly which is mounted upon the transversely moving slide 5, which is transversely movable by the operation of the handle 6. The pedestal or motor base 15 is mounted in place by the tightening of the nut 16 and fixes the location of the upstanding post 17 extending upwardly therefrom. The support for the present assembly, including the vertical wall 20 and collar 18 is adjustably mounted on the post 17 by the loosening and tightening of a bolt 19, and the support may be adjusted in elevation as well as in inclination with respect to the axis of the commutator mounted on the lathe.

An electric motor 21, with suitable energizing leads W therefor, is adjustably mounted on the wall 20 with the axis thereof extending vertically. The motor 21 may be adjustably mounted on the base 20, which is provided with slots, by means of bolts extending through the motor frame and slots. A bracket 30 extends on the opposite side of the collar 18 from the motor mounting on the support 20 and is provided with a vertically extending substantially semi-cylindrical concave surface for receiving a continuous cylindrical bearing bush 31 of suitable material such as bronze or phosphor-bronze which is attached for approximately half of its peripheral surface to the bracket, preferably by brazing. Preferably the vertical edge of the bracket is grooved to receive ½ inch tubing. The single continuous bearing sleeve not only results in distinct manufacturing economies, but in an improved unit which permanently maintains the alinement of the spindle disposed therein, particularly because the single bush prevents the entrance of dust and foreign matter into the bearing surfaces. Actual experience has shown that separated bearings, for example, bearings adjacent the drive wheel and cutter, wear very rapidly and must be replaced frequently to maintain the proper operating alinement of the spindle, thus increasing the cost of operations and at times serving to delay work for necessary repairs. An accurately machined rotary steel spindle 32 is fitted into the bearing bush 31 and a pulley 24 is mounted at the upper end thereof by means of a set screw 25. A coil spring 26 is disposed between the lower end of the pulley and a fiber washer 27 resting at the upper end of the bearing bush 31, and is of such resilience to substantially balance the weight of the pulley and the spindle assembly. A flexible transmission belt extends between the pulleys 22 and 23 and transmits the rotational movement of the electric motor to the rotary spindle.

A V-type milling cutter 35 of any desired angle and thickness is mounted at the lower end of the spindle. A mounting arrangement therefor is shown in Fig. 5 wherein a nut 33 is threaded onto lower extension 40 of the spindle 32 and the same is fixed to the latter by brazing as shown at 34. The milling cutter 35 is fitted upon the lower face of the nut 33 and is tightened in place by the nut 36 screwed upon the extremity of extension 40. Thereby a mounting is obtained providing for a convenient interchangeability of the milling cutters 35 which may be from 1½ inch to 1 inch outside diameter, with a 1¼ inch hole to fit over the lower face of the nut 33.

A modified construction of the mounting of the milling cutters is shown in Fig. 6 wherein extension of the spindle 32' is shown of longer form in order to accommodate the brazed nut 33' which is brazed to the spindle at 34'. Thereupon a milling cutter 35' is mounted adjacent the lower face of the bolt 33' followed by a spacing collar 41, another milling cutter 42, and finally by the tightening bolt 36' maintaining the assembly in tight condition. The provision of two milling cutters 35' and 42 make possible the milling of two slots at the same time, and the spacing between them may be varied by interchanging the collar 41 of different heights depending upon the width of the commutator segments.

The V-type milling cutters are preferred in order to enable the undercutting of the mica to any desired depth and at the same time slightly bevelling the copper bars to assure that all mica is removed from the commutator surface.

Provision is made for lubricating the rotary spindle by the cutting of an obliquely extending lubricating port 29 through the bracket 30 and bearing bush 31 terminating in a covered lubricating oiler 28.

In operation, the commutator is mounted in a lathe chuck and the support thereof is stabilized by supporting the opposite end thereof by the tailstock. The level of the support carrying the motor and cutter spindle is adjusted at the foremost part of the commutator and the inclination of the assembly is adjusted to afford maximum visibility to the operator with due regard to the travel of the miller cutter against the risers 10 of the commutator segments at the ends thereof opposite the points of initiation of the undercutting operation. The commutator is set with respect to the milling cutter and the motor is started, whereupon the cutter is advanced forwardly by feeding the transverse slide on the lathe carriage to effect the desired depth of the cut. Thereafter it is only necessary to operate the carriage either manually or by the machine drive so that the milling cutter traverses the length of the mica spacer. The undercutting operation is executed quickly and accurately since the floating spindle assures the travel of the milling cutter within the slot without possibility of scoring the commutator bars. The cut is of uniform depth and the slots can be milled as close to the risers as may be necessary. The undercutting operation is also effective in removing any copper which has been dragged across the mica slot. A stop may be placed on the lathe if desired to prevent the milling cutter from striking the commutator risers, which is useful for fast production work. Upon the completion of the undercutting operation on one slot, the milling cutter is brought back to its starting position, the commutator is rotated an extent corresponding to the spacing between the mica slots and the operation is repeated. When two milling cutters are employed, the undercutting operation is of course executed upon two adjacent slots simultaneously.

The apparatus described above is readily portable and may be disposed upon an improvised support adjacent to larger motors which require servicing by the undercutting of the mica strips. Thus any type of support other than a lathe could be employed in conjunction with larger motors such as mine motors to execute the undercutting thereof. Such supports could be provided with a feed for the undercutter device mounted forwardly of a large motor commutator whereupon the undercutting operations generally described above are performed thereupon.

While I have described my invention as embodied in specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. A commutator undercutting device comprising a post adapted to be detachably mounted on a movable carriage, a support adjustably mounted on said post, an electric motor attached to said support, a continuous vertical bearing sleeve on said support, a rotary shaft yieldingly mounted in said bearing sleeve provided with a milling cutter operable in a substantially horizontal plane on one end of said sleeve and a pulley on said shaft on the opposite end of said sleeve, and flexible transmission means extending between said motor and said pulley.

2. A commutator undercutting device comprising a post adapted to be detachably mounted on a movable carriage, a support, means for adjustably mounting said support on said post to vary the angular disposition and height of said support with respect to said post, an electric motor attached to said support on one side of said post, a continuous vertical bearing sleeve on said support on the opposite side of said post, a rotary spindle shaft yieldingly mounted in said bearing sleeve provided with a milling cutter operable in a substantially horizontal plane on one end of said sleeve and a pulley on said spindle shaft on the opposite end of said sleeve, and flexible transmission means extending between said motor and said pulley.

EVERETT R. MANLEY.